United States Patent Office 3,387,006
Patented June 4, 1968

3,387,006
17β-FLUOROALKOXY-3-KETOESTRENES
Gerhard R. Wendt, Havertown, and Kurt W. Ledig, Philadelphia, Pa., assignors to American Home Products Corporation, New York, N.Y., a corporation of Delaware
No Drawing. Filed Jan. 28, 1964, Ser. No. 340,819
4 Claims. (Cl. 260—397.4)

ABSTRACT OF THE DISCLOSURE

The invention concerns 17β-fluoroalkoxy-3-ketoestrenes, particularly those having the Formulae I and II as described below, and a process for their preparation. The products possess useful therapeutic properties as orally or parenterally active androgenic agents.

---

This invention relates to the synthesis of valuable steroid compounds. More particularly, this invention relates to novel 17β-fluoroalkoxy-3-ketoestrenes and 17β-fluoroalkoxy-3-alkoxyestrenes and to the method by which these steroids are prepared.

The novel steroids encompassed within the present invention are those defined by the Formulae I and II below:

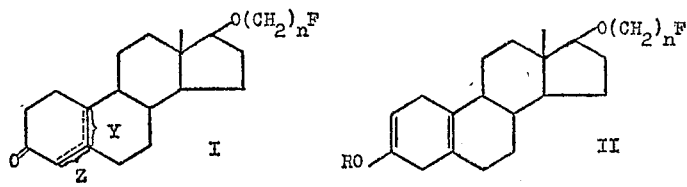

In the foregoing Formula I, Y is selected from the group consisting of saturated linkage or a double bond between $C_5$ and $C_{10}$; and Z is selected from the group consisting of a saturated linkage or a double bond between $C_4$ and $C_5$ with the proviso that when one of Y and Z is a saturated linkage the other of Y and Z is a double bond; and N is a whole number of from 1 to 4 inclusive. The compounds encompassed within Formula II above, which, as will be noted from the examples which follow, are intermediate to the valuable and useful steroids encompassed within Formula I, are useful for this purpose and are characterized in having a lower alkoxy substituent at the 3 position. Additionally, such steroids, i.e. those encompassed within Formula II, are useful as androgenic hormones. The substituent at the 17β-position of Formula II, namely the fluoroalkoxy, is similar to that of structure I where n has a value of from 1 to 4 inclusive. The new steroids encompassed within structure I possess useful therapeutic properties as orally or parenterally active androgenic agents.

To prepare the new compounds of the present invention encompassed within those defined by Formulae I and II above, the reaction sequence set forth below is followed:

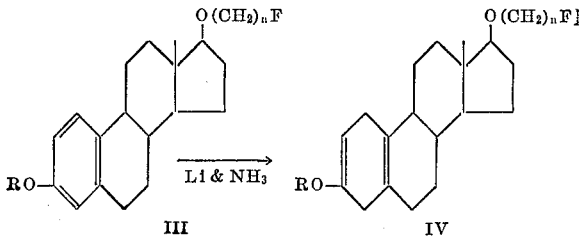

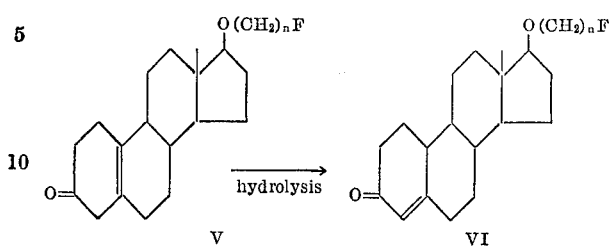

As suggested by the foregoing reaction sequence, in which R and n have the values previously ascribed, a 17β-(fluoroalkoxy)-3-alkoxyestra-1,3,5(10)-triene (III) is reduced with lithium and liquid ammonia in the present of an inert solvent. The starting material, 17β-fluoroalkoxy-3-methoxy-estra-1,3,5(10)-triene, is prepared by fluorination of d-17β-(2-hydroxyethoxy)-3-methoxyestra-1,3,5(10)-triene with diethylamino-1,1-difluoro-2,2-fluorochloro-ethane as described in our co-pending application Ser. No. 340,818 filed Jan. 28, 1964.

The product of the liquid ammonia-lithium reduction (IV) on stirring with a solution of oxalic acid in methanol-dioxane-water will, on precipitation with water and recrystallization, yield 17β-(fluoroalkoxy)estr-5(10)-en-3-one (V). The latter compound (V) on hydrolysis, by means of a dilute mineral acid, yields 17β-(fluoroalkoxy)estr-4-en-3-one (VI).

As will be evident by reference to Formula I above, the position of the double bond between the $C_5$–$C_{10}$ or $C_4$–$C_5$ positions will vary. To obtain the double bond at the $C_5$–$C_{10}$ position, it is necessary as described to react the product of the initial lithium-ammonia reduction, namely 17β-(fluoroalkoxy)-3-alkoxyestr-2,5(10) - diene with the oxalic acid methanol-dioxane-water solution for a period of about 2 hours. If the final product desired is to include the double bond between $C_4$ and $C_5$, hydrolysis of the 17β-fluoroalkoxyestr-5(10)-en-3-one is required. It is of course to be understood as described above with respect to Formula I that in any given steroid product, a double bond will be positioned at either the $C_5$–$C_{10}$ or the $C_4$–$C_5$ position and that the alternate position will be a saturated linkage.

A more complete understanding of the steroids of the present invention and the novel process by which they are prepared will be obtained by reference to the following specific examples:

Example I

A solution of 4.5 g. of 17β-(2-fluoroethoxy)-3-methoxyestra-1,3,5(10)-triene, 200 ml. of tetrahydrofuran, 100 ml. of 1-methoxy-2-propanol, and 500 ml. of liquid ammonia is treated with 4.5 g. of lithium while stirring. After the addition of 37 g. of ammonium chloride and water, the product is filtered to give 4.5 g. of crude 17β-(2-fluoroethoxy)-3-methoxyestra-2,5(10)-diene; UV essentially no aromatic; IR 5.9, 6.0μ.

A sample of 4.5 g. of 17β-(2-fluoroethoxy)-3-methoxyestra-2,5(10)-diene is stirred with a solution of 4.0 g.

of oxalic acid dihydrate in 70 ml. of methanol, 20 ml. of dioxane and 20 ml. of water for two hours. The product is precipitated with water and recrystallized from methanol-water to give 2.5 g. of 17β-(2-fluoroethoxy)estr-5(10)-en-3-one; M.P. 99–101° C.; IR 5.8μ.

Example II

A sample of 2.5 g. of 17β-(2-fluoroethoxy)estr-5(10)-en-3-one is stirred with a solution of 70 ml. of methanol, 5 ml. of concentrated hydrochloric acid, and 10 ml. of water for two hours. After the addition of water, the product is extracted with ether and the gum chromatographed over alumina (grade III; neutral) and eluted with benzene. Recrystallization from methanol gives the desired product, 17β-(2-fluoroethoxy)estr-4-en-3-one, M.P. 95–96° C., UV 240 (17,000). (Found: C, 74.99; H, 8.96; F, 6.10; $C_{20}H_{29}O_2F$ requires, C, 74.96; H, 9.12; F, 5.93%.)

Example III

When 17β(3-fluoropropoxy)-3-methoxyestra-1,3,5(10)-triene is reduced as in Example I and the product hydrolyzed as in Example II, 17β-(3-fluoropropoxy)estr-4-en-3-one is obtained.

Example IV

Reduction of 17β-(4-fluorobutoxy)-3-methoxy-1,3,5(10)-triene according to the method of Example I yields 17β-(4-fluorobutoxy)estr-5(10)-en-3-one.

Example V

Hydrolysis of the product of Example IV according to the method of Example II gives 17β-(4-fluorobutoxy)estr-4-en-3-one.

Example VI

Reduction of 17β-(2-fluoroethoxy)-3-butoxyestra-1,3,5(10)-triene according to the method of Example I yield 17β-(2-fluoroethoxy)-3-butoxyestra-2,5(10)-diene.

Example VII

When 17β-(3-fluoropropoxy)-3-ethoxyestra-1,3,5(10)-triene is reduced as in Example 1, 17β-(3-fluoropropoxy)-3-ethoxyestra-2,5(10)-diene is obtained.

While the foregoing invention has been described with a considerable degree of particularity in the specific examples above, it is to be understood that the invention is not to be limited thereby but is only to be limited by the claims appended hereto.

The invention claimed is:

1. A compound selected from the group consisting of those having the formula:

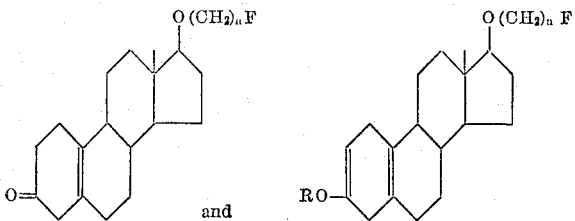

and where R is lower alkyl and $n$ is a whole number from 1 to 4 inclusive.

2. 17β(2-fluoroethoxy)-3-methoxyestra-2,5(10)-diene.
3. 17β-(4-fluorobutoxy)estr-5(10)-en-3-one.
4. 17β-(2-fluoroethoxy)-3-butoxyestra-2,5(10)-diene.

References Cited

"Steroid Reactions," by Djrassi (1963), p. 284 relied on. See Formulas 122–124.

J. Chem. Soc. (1962), Burn et al., pp. 364–365 relied on.

ELBERT L. ROBERTS, *Primary Examiner.*

LEWIS GOTTS, *Examiner.*